(12) United States Patent
Tang

(10) Patent No.: US 7,687,410 B2
(45) Date of Patent: Mar. 30, 2010

(54) INORGANIC WOOD-LIKE MATERIAL

(76) Inventor: Hung Tang, Rm. 1432-1433, 14/F., Kwai On Fty. Bldg., 103-113 Tai Lin Pai Road, Kwai Chung, N.T. (HK)

( * ) Notice: Subject to any disclaimer, the term of this patent is extended or adjusted under 35 U.S.C. 154(b) by 377 days.

(21) Appl. No.: 11/561,797

(22) Filed: Nov. 20, 2006

(65) Prior Publication Data
US 2007/0087182 A1    Apr. 19, 2007

Related U.S. Application Data

(63) Continuation-in-part of application No. 10/488,344, filed on Aug. 16, 2004, now abandoned.

(30) Foreign Application Priority Data

Sep. 20, 2001  (CN) ................. 01 1 06631
Feb. 10, 2002  (CN) ................. 02 1 04652
Sep. 12, 2002  (CN) ............ PCT/CN02/00639

(51) Int. Cl.
*B32B 5/16*   (2006.01)
*D03D 9/00*   (2006.01)
*D04H 3/16*   (2006.01)
*B29C 59/00*  (2006.01)

(52) U.S. Cl. .................. 442/44; 442/6; 442/24; 442/32; 264/115; 264/122; 428/292.1

(58) Field of Classification Search ........ 442/1; 106/711, 792, 800, 286.1, 286.2
See application file for complete search history.

(56) References Cited

U.S. PATENT DOCUMENTS 4,585,703 A  *  4/1986  Taguchi et al. ............. 428/446
4,983,342 A  *  1/1991  Berg et al. .................. 264/113
5,743,986 A  *  4/1998  Colombo ............... 156/244.11
6,086,804 A  *  7/2000  Akiyama et al. ............ 264/115

FOREIGN PATENT DOCUMENTS

CN          1141890 A   *  2/1997

* cited by examiner

*Primary Examiner*—D. Lawrence Tarazano
*Assistant Examiner*—Altrev C Sykes
(74) *Attorney, Agent, or Firm*—J.C. Patents

(57) ABSTRACT

The present invention relates to an inorganic wood-like material, which can be used as a sheet instead of wood, characterized that the said material mainly includes magnesite, magnesium chloride, lime powder, glass fiber, talcum powder and kaolin. The method of preparing the same includes pulverizing, mixing this material in different proportion and molding the mixture to obtain the inorganic wood-like material of the present invention. The material can exhibits a laminated structure comprising wear-resistant surface layer (11), an inorganic material layer (12) and a wear-resistant bottom layer (13). The material can be used for buildings. It is non-toxic, odorless, rustless, non-inflammable and non-oxidable. Its appearance looks like wood and it is easy to be processed. The material is a good environment-protecting material and will be widely accepted by industry and commerce.

11 Claims, 2 Drawing Sheets

INORGANIC WOOD-LIKE MATERIAL

FIELD OF THE INVENTION

The present invention relates to building materials, more particularly, to an inorganic wood-like material as a substitute for natural wood.

BACKGROUND OF THE INVENTION

It has been well realized by more and more people that trees play an important role to the environment of human beings. In order to reduce the consume of natural wood, researchers are working for seeking wood substitutes. It is an object of the present invention to provide an inorganic wood-like material made from cheap minerals and non-toxic recycled materials to change the history of only replying on natural wood material in building industry.

SUMMARY OF THE INVENTION

The object of the invention is achieved by providing an inorganic wood-like material made of raw minerals, such as magnesite, magnesium chloride, lime powder, plant powder, glass fibre, protective mesh and processed to a sheet as a kind of man-made inorganic wood substitute.

The inorganic wood-like material is made of hard raw minerals. Such material is fire-resistant (non-inflammable), water-proof, anti-corrosive, non-rust, durable and non-oxidation, non-deformable and cannot be eaten by mouse and moth. The material can be planned, sawed, can bold nails and screws tightly. The surface of the sheet is easy to be processed. The certificate of fire-resistance up to 4-hours under BS476PARTZO has been issued with respect to the material of the present invention.

BRIEF DESCRIPTION OF THE DRAWINGS

The invention will be described with reference to the following drawings:

FIG. 4 shows various applications of the sheet made of the inorganic wood-like material of the present invention, including fire-resistant doors, prefabricated houses, garages, heat and sound insulating walls, roof-covers, plates, sandwich plates and floorings, ceilings, movable toilets, rails, enclosing walls for construction sites, and so on.

DETAILED DESCRIPTION OF THE INVENTION

The features of the inorganic wood-like material of the invention will be described in details with reference to the accompany drawings.

Figure 1:
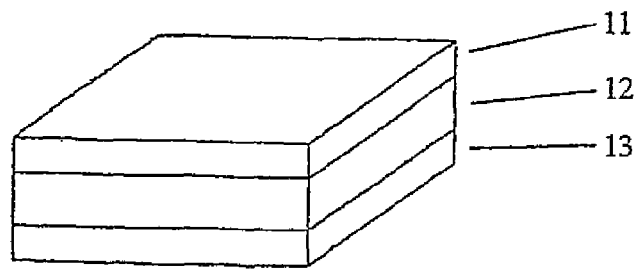
FIG. 1 shows an illustrating view of a first embodiment of the sheet made of the inorganic wood-like material of the present invention.

With reference to FIG. 1, FIG. 1 shows an illustrating view of a first embodiment of the sheet made of the inorganic wood-like material of the present invention. The inorganic wood-like material comprises magnesite, magnesium chloride, lime powder, glass fibre, talcum powder and kaolin. Such raw materials are pulverized to become particles or powders and then molded to form a sheet for use. In this embodiment, the laminated structure of the sheet includes three layers from the outer side to the inner side, i.e. a wear-resistant surface layer 11, an inorganic material layer 12, and a wear-resistant bottom layer 13, in which the composition and the ratio of the components of the two-wear-resistant lays are same, which comprise 45%-60% magnesite, 15%-20% magnesium chloride, 5%-10% lime powder, 0.8%-10% glass fibre, 5%-8% talcum powder, and 10%-15% kaolin (by weight percentage). Beside the above-mentioned components in the same ratio, the inorganic material layer 12 sandwiched between the wear-resistant surface layer 11 and the wear-resistant bottom layer 13 further comprises 18%-25% plant powder in order to be capable of holding nails tightly. However, the other two layers cannot contain such plant powder to ensure that they are hard and wear-resistant.

Figure 2:
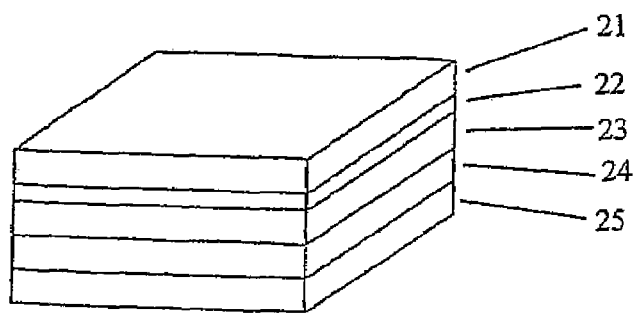
FIG. 2 shows an illustrating view of a second embodiment of the sheet made of the inorganic wood-like material of the present invention.

With reference to FIG. 2, FIG. 2 shows an illustrating view of a second embodiment of the sheet made of the inorganic wood-like material of the present invention. In this embodiment, the laminated structure of the sheet includes five layers from the outer side to the inner side, i.e. a wear-resistant layer 21, an inorganic material layer 22, a heat and sound insulating layer 23, an inorganic material layer 24 and a wear-resistant bottom layer 25. Compared with the first embodiment in FIG. 1, the wear-resistant surface layer 21 and the wear-resistant bottom layer 25 are the same as those layers 11 and 13; the inorganic material layers 22 and 24 are the same as inorganic material layer 12 of the above-mentioned embodiment. In addition, the sheet of the present embodiment further comprises a heat and sound insulating layer, so that it has an additional function of heat and sound insulation, which is advantageous over the first embodiment. The heat and sound insulating layer comprise similar components as those of inorganic material layer 12, except that it further comprises 10%-20% glass wool. Such heat and sound insulating sheet is suitable for partition of apartment and cold storage.

Figure 3:
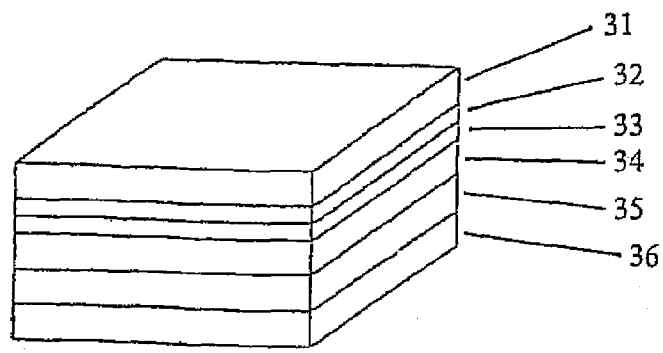
FIG. 3 shows an illustrating view of a third embodiment of the sheet made of the inorganic wood-like material of the present invention.

With reference to FIG. 3, FIG. 3 shows an illustrating view of a third embodiment of the sheet made of the inorganic wood-like material of the invention. The laminated structure of the sheet comprises six layers from the outer side to the inner side, i.e. a wear-resistant layer 31, a protective mesh layer 32, an inorganic material layer 33, a heat and sound insulating layer 34, an inorganic material layer 35, and a wear-resistant layer 36. As compared with the second embodiment shown in FIG. 2, the difference is that the sheet of the third embodiment includes a protective mesh layer 32. Therefore, it is more difficult to break the sheet of the present embodiment. When being impacted by a hard object, the sheet will not tend to smash to pieces. It is tough. The main components of each layers are similar to those layers of the embodiment in FIG. 2, essentially containing magnesite, magnesium chloride, lime powder, glass fibre, talcum powder, kaolin and plant stalk powder, except for the protective mesh layer 32, which may weight about 0.5%-0.8% of the total weight of the sheet. The protective mash can be a metal net, or a glass fibre net, woven or nonwoven glass fibre cloth. Such laminated sheet is fire-resistant, water-proof, heat and sound insulating, cannot be eaten by mouse and moth, and provide enhanced protection against impact. It can be used repeatedly to form movable houses, garages, camps, enclosing walls for construction site, and so on. In order to become more sturdy, such sheet could be added 0.8%-10% enhanced additive when used as outer walls.

Figure 4:
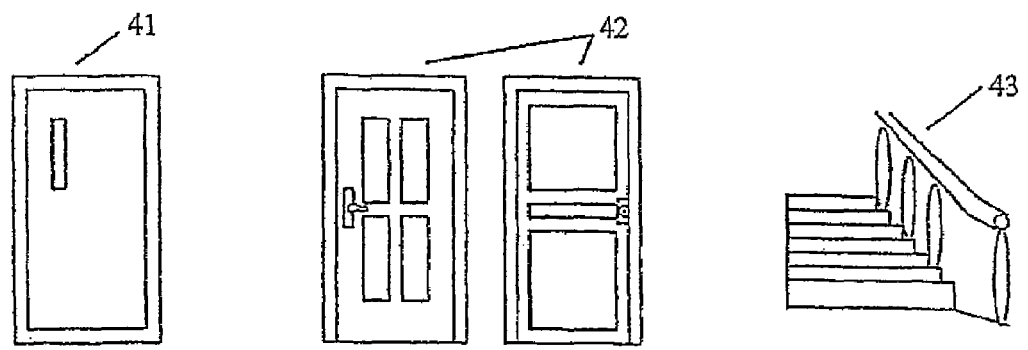
Figure 4:
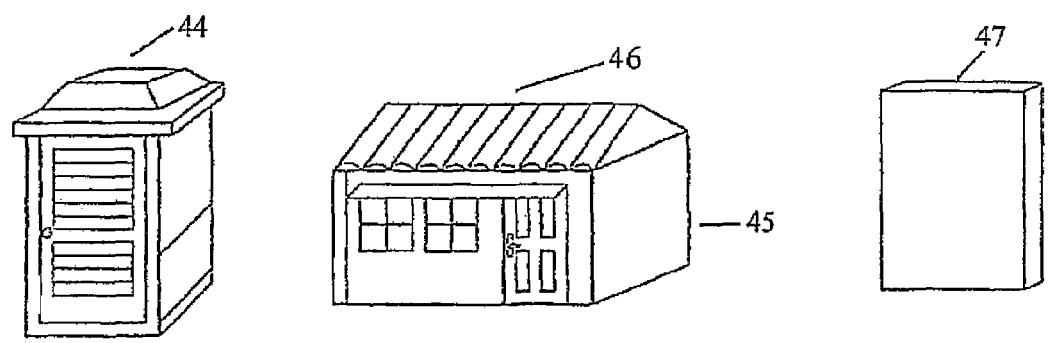
Figure 4:
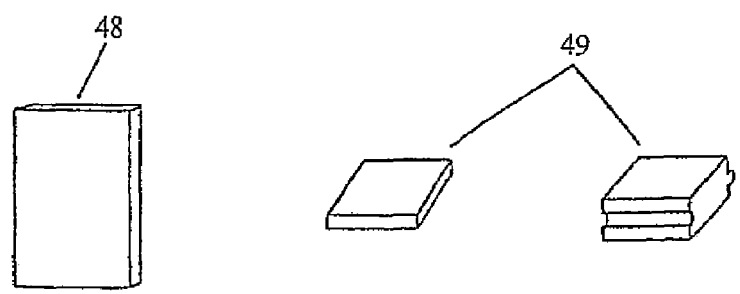
Figure 4:
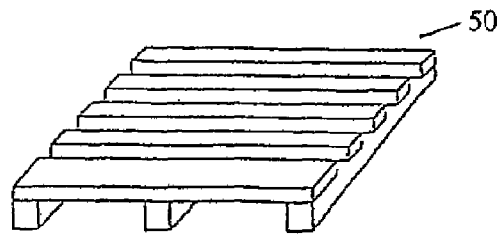

With reference to FIG. 4, FIG. 4 shows examples of the application of the sheet made of the inorganic wood-like material of the present invention. As shown, the sheet of the invention can be used to form fire-resistant doors 41, doors 42, indoor and outdoor stairs and rails 43, movable toilets, houses and prefabricated houses/camps 45, roof-covers 46, fire-resistant plates 47, ceilings 48, plates, sandwich plates and floorings 49, pallets for transportation, and so on.

Since the material of the present invention has distinctive advantages, it will be widely accepted by industry and commerce.

The method of producing the wood-like material sheet or other articles with desired shape is described below. For example, the wood-like material sheet shown in FIG. 1 can be produced as follows. A magnesium chloride solution, such as a water solution of magnesium chloride, is prepared, which is used as a binder. No additional binder is required during the process of molding a sheet or other article from the wood-like material of the present invention. In this embodiment, magnesium chloride is dissolved in water to obtain a uniform water solution of magnesium chloride with a density of about 22-25 degrees of the Baumé hydrometer scale. For producing the wear-resistant layers 11 and 13, a dry mixture of components such as magnesite, lime powder, glass fibre, talcum powder, and kaolin is prepared and thoroughly mixed. These components are pulverized or in powder form, the glass fibre is in the form of fine pieces as well known in the art. The percentage of the above components is determined so that the final product comprises 45%-60% magnesite, 15%-20% magnesium chloride, 5%-10% lime powder, 0.8%-10% glass fibre, 5%-8% talcum powder, and 10%-15% kaolin (by weight percentage). If desirable, other additives can be added. Then, the dry mixture is blended with the water solution of magnesium chloride with a density of about 22-25 degrees of the Baumé hydrometer scale to obtain an uniform slurry mixture. In this embodiment, the slurry mixture contains about 30% of the dry mixture and about 70% (by weight) of the water solution of magnesium chloride. If desirable other ratio can be used, for example, 25%-35% of the dry mixture and 65%-75% of the water solution of magnesium chloride are used to form a slurry mixture. The uniform slurry mixture is poured into a mold of desired shape (In this embodiment, a sheet is molded) for molding. The uniform slurry mixture can be cured in the mold at ambient temperature and pressure or to be heated to shorten the cure time. Under ambient temperature and pressure, curing process will take several hours, for example about 8 hours. While under heated condition, it takes much shorter time, for example as short as about 30 minutes, to cure the slurry mixture.

For producing the inorganic material layer 12, similar process is used except that, in addition to magnesite, lime powder, glass fibre, talcum powder, and kaolin, the dry mixture further includes plant powders. The percentage of the above components is determined so that the final product comprises 45%-60% magnesite, 15%-20% magnesium chloride, 5%-10% lime powder, 0.8%-10% glass fibre, 5%-8% talcum powder, 10%-15% kaolin, and 18%-25% (by weight percentage) plant powder. The dry mixture is then mixed with the water solution of magnesium chloride with a density of about 22-25 degrees of the Baumé hydrometer scale in the above described ratio, and cured in a mold.

The wear-resistant layers 11, 13 and the inorganic material layer 12 produced above are bounded together to form the laminated structure of FIG. 1. They can be bounded by glue, or nail, or by other chemical or mechanical means.

The heat and sound insulating layer 23 shown in FIG. 2 is produced in the same manner as the inorganic material layer 12 except that, in addition to magnesite, lime powder, glass fibre, talcum powder, kaolin, and plant powder, the dry mixture further includes glass wool. The percentage of the above components is determined so that the final product comprises 45%-60% magnesite, 15%-20% magnesium chloride, 5%-10% lime powder, 0.8%-10% glass fibre, 5%-8% talcum powder, 10%-15% kaolin, 18%-25% plant powder, and 10%-20% glass wool. The dry mixture is then mixed with the water solution of magnesium chloride with a density of about 22-25 degrees of the Baumé hydrometer scale in the above described ratio, and cured in a mold.

What is claimed is:

1. An inorganic material, suitable for making sheets to be used as wood substitutes, characterized in that said material comprises 45%-60% magnesite, 15%-25% magnesium chloride, 5%-10% lime, 0.8%-10% glass fibre, 5%-8% talcum, and 10%-15% kaolin by weight based on the total composition of said inorganic material;
   wherein said inorganic material is obtained by blending a water solution of magnesium chloride with a mixture comprising magnesite, lime powder, glass fibre, talcum powder, and kaolin to form a wet mixture and, then, curing the wet mixture.

2. The inorganic material as claimed in claim 1, characterized in that said magnesite, magnesium chloride, lime, glass fibre, talcum and kaolin are pulverized to become particles and/or powder, and then form a sheet for use.

3. A sheet of a laminated structure comprising:
   a first wear-resistant layer made of the inorganic material according to claim 1;
   a first intermediate layer made of a material comprising 45%-60% magnesite, 15%-25% magnesium chloride, 5%-10% lime, 0.8%-10% glass fibre, 5%-8% talcum, 10%-15% kaolin, and 18%-25% plant stalk powder by weight based on the total composition of said material; and
   a second wear-resistant layer made of the inorganic material according to claim 1;
   wherein the first intermediate layer is sandwiched between the first wear-resistant layer and the second wear-resistant layer, and the first intermediate layer is obtained by blending a water solution of magnesium chloride with a mixture comprising magnesite, lime powder, glass fibre, talcum powder, kaolin, and plant stalk powder to form a wet mixture and, then, curing the wet mixture.

4. The sheet of claim 3 further comprising:
   a second intermediate layer made of a material comprising 45%-60% magnesite, 15%-25% magnesium chloride, 5%-10% lime, 0.8%-10% glass fibre, 5%-8% talcum, 10%-15% kaolin, and 18%-25% plant stalk powder by weight based on the total composition of said material; and
   a heat and sound insulating layer made of a material comprising 45%-60% magnesite, 15%-25% magnesium chloride, 5%-10% lime, 0.8%-10% glass fibre, 5%-8% talcum, 10%-15% kaolin, 18%-25% plant stalk powder, and 10%-20% glass wool by weight based on the total composition of said material;
   wherein the heat and sound insulating layer is sandwiched between the first intermediate layer and the second intermediate layer.

5. The sheet of claim 4 further comprising a protective mesh layer sandwiched between the first wear-resistant layer and the first intermediate layer, wherein the protective mesh layer comprises glass fibre cloth or metal net which weights about 0.5%-0.8% of the total weight of the sheet.

6. An article made of an inorganic material comprising 45%-60% magnesite, 15%-25% magnesium chloride, 5%-10% lime, 0.8%-10% glass fibre, 5%-8% talcum and 10%-15% kaolin, wherein said article is obtained by blending a water solution of magnesium chloride with a mixture comprising magnesite, lime powder, glass fibre, talcum powder, and kaolin to form a wet mixture and, then, curing and molding the wet mixture.

7. The article of claim 6, wherein said material further comprises 18%-25% plant stalk powder.

8. The article of claim 7, wherein said material further comprises 10%-20% glass wool.

9. The inorganic material of claim 1, further comprising 18%-25% plant stalk powder.

10. The inorganic material of claim 9, further comprising 10%-20% glass wool.

11. An inorganic material, suitable for making sheets to be used as wood substitutes, characterized in that said material consists substantially of 45%-60% magnesite, 15%-25% magnesium chloride, 5%-10% lime, 0.8%-10% glass fibre, 5%-8% talcum, and 10%-15% kaolin by weight based on the total composition of said inorganic material;

wherein said inorganic material is obtained by blending a water solution of magnesium chloride with a mixture comprising magnesite, lime powder, glass fibre, talcum powder, and kaolin to form a wet mixture and, then, curing the wet mixture.

* * * * *